United States Patent
Yamada

(10) Patent No.: US 8,270,946 B2
(45) Date of Patent: Sep. 18, 2012

(54) MOBILE TERMINAL AND METHOD FOR CONTROLLING LOCK AND UNLOCK FUNCTIONS BY MEANS OF CONTACT SENSOR

(75) Inventor: Eiko Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 551 days.

(21) Appl. No.: 12/278,869

(22) PCT Filed: Jan. 26, 2007

(86) PCT No.: PCT/JP2007/051311
§ 371 (c)(1),
(2), (4) Date: Aug. 8, 2008

(87) PCT Pub. No.: WO2007/091436
PCT Pub. Date: Aug. 16, 2007

(65) Prior Publication Data
US 2010/0167693 A1    Jul. 1, 2010

(30) Foreign Application Priority Data
Feb. 8, 2006    (JP) ................................. 2006-031184

(51) Int. Cl.
*H04M 3/16*    (2006.01)
(52) U.S. Cl. .................. 455/410; 455/475.1; 455/550.1; 455/418; 455/411; 713/182; 713/186; 709/227; 345/173
(58) Field of Classification Search .................. 455/411, 455/550.1, 418, 420, 432.2, 575.1–575.6, 455/410; 713/182, 186; 709/227; 345/173
See application file for complete search history.

(56) References Cited

U.S. PATENT DOCUMENTS

| 6,631,192 B1 * | 10/2003 | Fukiharu .................. 379/433.07 |
| 7,664,961 B2 * | 2/2010 | Blattner et al. ............... 713/186 |
| 2005/0079896 A1 | 4/2005 | Kokko et al. |

(Continued)

FOREIGN PATENT DOCUMENTS

EP    1109382 A    6/2001

(Continued)

OTHER PUBLICATIONS

International Search Report for PCT/JP2007/051311, mailed Feb. 20, 2007.

(Continued)

*Primary Examiner* — Jean Gelin
*Assistant Examiner* — Babar Sarwar

(57) ABSTRACT

There are provided a mobile terminal capable of switching a function of the mobile terminal depending on whether a sensor is contacted or not contacted, a mobile terminal control method, a mobile terminal control program, and a recording medium. A mobile phone 1 includes a touch sensor 9 at a position where a user generally contacts the mobile phone 1 when the user holds it. While a user is in contact with the touch sensor 9, the mobile phone 1 can perform normal operation. If the mobile phone 1 continues to be not in contact with the touch sensor 9 for a certain time, it switches from the normal operation. For example, assume that a lock mode setting is made. The mobile phone 1 switches to a lock mode while it is not in contact with the touch sensor 9. When the touch sensor 9 is contacted again, the mobile phone 1 shifts to a state for unlock processing such as password entry. If an entry is normally made, the mobile phone 1 is unlocked.

20 Claims, 5 Drawing Sheets

U.S. PATENT DOCUMENTS

2005/0226468 A1 10/2005 Deshpande et al.
2006/0075250 A1* 4/2006 Liao .............................. 713/182

FOREIGN PATENT DOCUMENTS

| EP | 1536617 A | 6/2005 |
| JP | 2002204301 A | 7/2002 |
| JP | 2003188942 A | 7/2003 |
| JP | 2003289352 A | 10/2003 |
| JP | 2005268983 A | 9/2005 |

OTHER PUBLICATIONS

Supplementary European Search Report for EP 07 70 7543 issued Jun. 18, 2010.

* cited by examiner

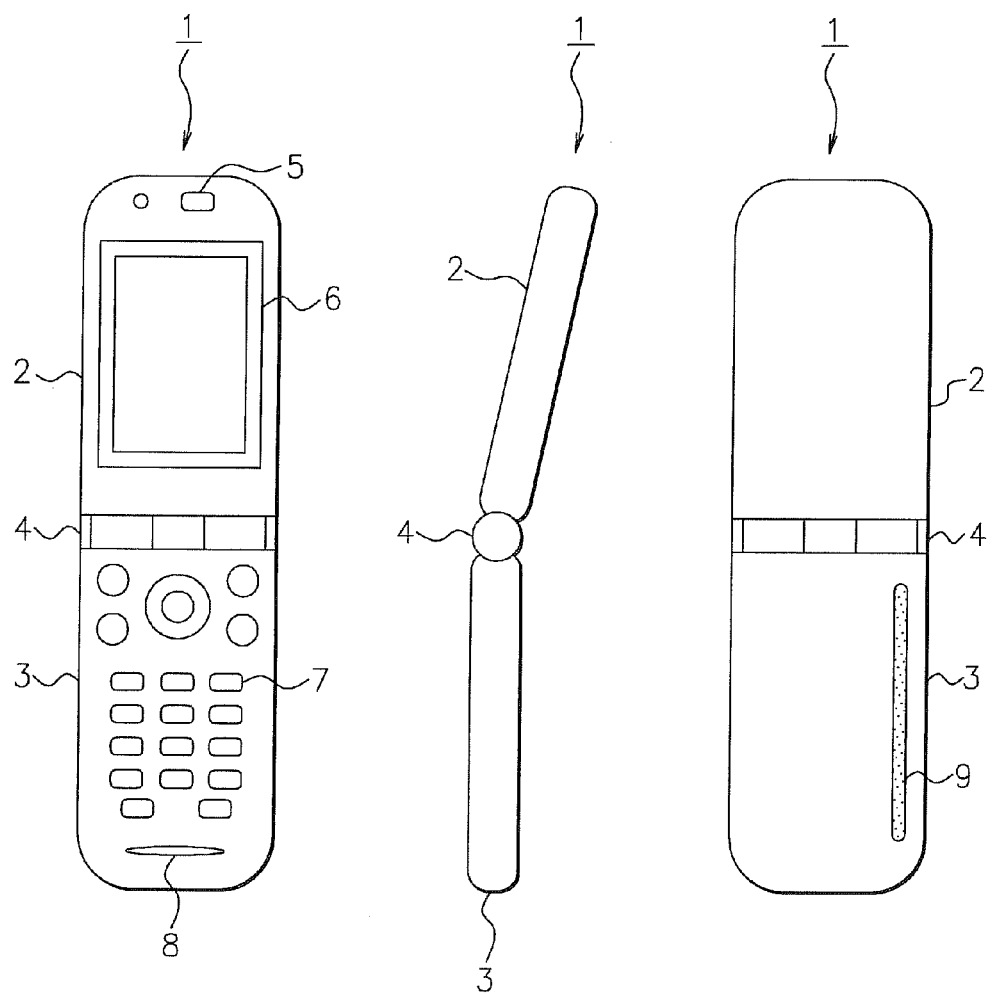
F I G. 1

MOBILE TERMINAL AND METHOD FOR CONTROLLING LOCK AND UNLOCK FUNCTIONS BY MEANS OF CONTACT SENSOR

TECHNICAL FIELD

The present invention relates to a mobile terminal that switches mobile terminal control in conjunction with a sensor, a mobile terminal control method, a mobile terminal control program, and a recording medium.

BACKGROUND ART

In recent years, mobile terminals such as a mobile phone have become diverse and multifunctional. Along with this, the diffusion rate of mobile terminals has been increasing, and mobile terminals have become essential to daily life. For example, a mobile phone not only makes a call but also has the function of connecting to the Internet, the function of picking up images, the function of playing music and moving images, and the like. Some mobile phones further have a credit function.

Against the above-described background, security functions of mobile terminals are attracting attention. As described above, amid the development of multifunctionality, mobile terminals are closely related to daily life, and most of them have a user's personal information recorded therein. A dial lock or the like is generally used as a security measure for a mobile terminal.

As a conventional technique related to mobile terminal security, the invention disclosed in Patent Document 1 is publicly known. Patent Document 1 discloses an invention in which a touch sensor is provided in a mobile phone to start a dial lock release sequence when a person contacts the touch sensor and a technique for shortening waiting time for unlocking using the invention and improving convenience.
Patent Document 1: Japanese Patent Laid Open Publication No. 2005-268983.

DISCLOSURE OF INVENTION

Problem to be Solved by the Invention

In a security lock method in a conventional mobile terminal, a user navigates through function menus of the mobile terminal to lock or unlock the mobile terminal. Accordingly, there are problems such as operation is troublesome, and a lock utilization rate is low. Some mobile terminals are locked with an operation such as pressing a predetermined key long enough. However, unlocking of the mobile terminals requires navigation through functional menus, and consequently the operation still remains troublesome.

One of the major factors which makes lock operation troublesome is that a user needs to perform lock operation for each function of a multifunctional mobile terminal. This is also a major factor which causes the lock utilization rate for a mobile terminal to reduce.

In the invention disclosed in Patent Document 1, a setting is made such that a mobile phone is always automatically locked, and an unlock device is provided as an external device other than the mobile phone. That is, to shorten an unlock time for a mobile phone, an unlock device is always required, and it is necessary to carry the mobile phone and unlock device together. If an unlock device is downsized for convenience of carrying, the unlock device may be lost. In this case, unlocking becomes far more difficult than general unlock processing.

Means for Solving the Problems

In consideration of the above-described problems, the present invention has as its exemplary object to provide a mobile terminal capable of switching a function of the mobile terminal depending on whether a sensor is contacted or not contacted, a mobile terminal control method, a mobile terminal control program, and a recording medium.

In order to achieve the above-described object, the invention according to a first aspect is a mobile terminal including a sensor that senses contact from an outside, characterized by comprising a control unit that controls the mobile terminal, a determination unit that determines presence or absence of contact with the sensor, and a switching unit that switches control over the mobile terminal, wherein the control over the mobile terminal is switched by the switching unit on the basis of results of a determination made when the sensor is contacted and a determination made when the sensor is not contacted obtained from the determination unit.

The invention according to a second aspect in the mobile terminal according to the first aspect is characterized in that the switching unit switches the control to provide the control for normal operation when the sensor is contacted and limit the control for the normal operation or add other control to the control for the normal operation when the sensor is not contacted.

The invention according to a third aspect in the mobile terminal according to the first or second aspect is characterized in that the switching unit switches from the control when the sensor is not contacted to the control when the sensor is contacted if the determination unit determines that the sensor is contacted in a state when the sensor is not contacted and switches from the control when the sensor is contacted to the control when the sensor is not contacted if the determination unit determines that the sensor is not contacted in a state when the sensor is contacted.

The invention according to a fourth aspect in the mobile terminal according to any one of the first to third aspects is characterized in that the mobile terminal includes a timer that measures a contact time and a non-contact time for the sensor and a switching time setting unit that sets a first set time for switching from the control when the sensor is contacted to the control when the sensor is not contacted and a second set time for switching from the control when the sensor is not contacted to the control when the sensor is contacted, and the switching unit switches the control when the contact time reaches the second set time or when the non-contact time reaches the first set time.

The invention according to a fifth aspect in the mobile terminal according to the fourth aspect is characterized in that the switching unit switches the control stepwise on the basis of the first set time and the second set time.

The invention according to a sixth aspect in the mobile terminal according to any one of the first to fifth aspects is characterized by comprising an authentication unit that authenticates switching of the control over the mobile terminal, wherein the control is switched only when the authentication is successful.

The invention according to a seventh aspect in the mobile terminal according to the sixth aspect is characterized in that the mobile terminal comprises a personal information storage unit that stores personal information of an operator upon contact with the sensor and a comparison unit that compares the personal information stored in the personal information storage unit with contact information currently in contact with the sensor, wherein the switching unit switches the control without the authentication if a result of comparison in the comparison unit shows that the personal information and the contact information agree with each other.

The invention according to an eighth aspect in the mobile terminal according to the seventh aspect is characterized in that the sensor is a fingerprint sensor or a vein sensor.

The invention according to a ninth aspect is a control method for a mobile terminal including a sensor that senses contact from an outside, characterized by comprising a determination step of determining whether the sensor is contacted or not contacted and a switching step of switching control over the mobile terminal in accordance with a determination that the sensor is contacted or a determination that the sensor is not contacted obtained from the determination step.

The invention according to a tenth aspect in the mobile terminal control method according to the ninth aspect is characterized in that the switching step switches the control to provide the control for normal operation if the determination that the sensor is contacted is obtained and limit the control for the normal operation or add other control to the control for the normal operation if the determination that the sensor is not contacted is obtained.

The invention according to an eleventh aspect in the mobile terminal control method according to the ninth or tenth aspects is characterized in that the switching step switches from the control when the sensor is not contacted to the control when the sensor is contacted if it is determined that the sensor is contacted in the determination step in a state when the sensor is not contacted and switches from the control when the sensor is contacted to the control when the sensor is not contacted if it is determined that the sensor is not contacted in the determination step in a state when the sensor is contacted.

The invention according to a twelfth aspect in the mobile terminal control method according to any one of the ninth to eleventh aspects is characterized in that the mobile terminal includes a timer that measures a contact time and a non-contact time for the sensor, the method comprises a switching time setting step of setting a first set time for switching from the control when the sensor is contacted to the control when the sensor is not contacted and a second set time for switching from the control when the sensor is not contacted to the control when the sensor is contacted, and the switching step switches the control when the contact time reaches the second set time or when the non-contact time reaches the first set time.

The invention according to a thirteenth aspect in the mobile terminal control method according to the twelfth aspect is characterized in that the switching step switches the control stepwise on the basis of the first set time and the second set time.

The invention according to a fourteenth aspect in the mobile terminal control method according to any one of the ninth to thirteenth aspects is characterized by comprising an authentication step of authenticating switching of the control over the mobile terminal, wherein the control is switched only when the authentication is successful.

The invention according to a fifteenth aspect in the mobile terminal control method according to the fourteenth aspect is characterized in that the mobile terminal comprises a personal information storage step of storing, in advance, personal information of an operator upon contact with the sensor and a comparison step of comparing the personal information stored in the personal information storage step with contact information currently in contact with the sensor, wherein the switching step switches the control without the authentication if a result of comparison in the comparison step shows that the personal information and the contact information agree with each other.

The invention according to a sixteenth aspect is a mobile terminal control program for controlling a mobile terminal including a sensor that senses contact from an outside, characterized by causing the mobile terminal to execute a control process of controlling the mobile terminal, a determination process of determining whether the sensor is contacted or not contacted, and a switching process of switching control over the mobile terminal, wherein the switching process switches the control over the mobile terminal in accordance with a determination that the sensor is contacted or a determination that the sensor is not contacted obtained from the determination process.

The invention according to a seventeenth aspect in the mobile terminal control program according to the sixteenth aspect is characterized in that the switching process switches the control to provide the control for normal operation when the sensor is contacted and limit the control for the normal operation or add other control to the control for the normal operation if the sensor is not contacted.

The invention according to an eighteenth aspect in the mobile terminal control program according to the sixteenth or seventeenth aspect is characterized in that the switching process switches from the control when the sensor is not contacted to the control when the sensor is contacted if the determination process determines that the sensor is contacted in the state when the sensor is not contacted and switches from the control when the sensor is contacted to the control when the sensor is not contacted if the determination unit determines that the sensor is not contacted in the state when the sensor is contacted.

The invention according to a nineteenth aspect in the mobile terminal control program according to any one of the sixteenth to eighteenth aspects is characterized in that the mobile terminal includes a timer that measures a contact time and a non-contact time for the sensor, the program causes the mobile terminal to execute a switching time setting process of setting a first set time for switching from the control when the sensor is contacted to the control when the sensor is not contacted and a second set time for switching from the control when the sensor is not contacted to the control when the sensor is contacted, and the switching process switches the control when the contact time reaches the second set time or when the non-contact time reaches the first set time.

The invention according to a twentieth aspect in the mobile terminal control program according to the nineteenth aspect is characterized in that the switching process switches the control stepwise on the basis of the first set time and the second set time.

The invention according to a twenty-first aspect in the mobile terminal control program according to any one of the sixteenth to twentieth aspects is characterized by causing the mobile terminal to execute an authentication process of authenticating switching of the control over the mobile terminal, wherein the switching process switches the control only when the authentication is successful.

The invention according to a twenty-second aspect in the mobile terminal control program according to the twenty-first aspect is characterized by causing the mobile terminal to execute a personal information storage process of storing, in advance, personal information of an operator upon contact with the sensor and a comparison process of comparing the personal information stored in the personal information storage process with contact information currently in contact with the sensor, wherein the switching process switches the control without the authentication if a result of comparison in the comparison process shows that the personal information and the contact information agree with each other.

The invention according to a twenty-third aspect is a non-transitory computer-readable recording medium having recorded thereon a mobile terminal control program according to any one of the sixteenth to twenty-first aspects.

As described above, according to a mobile terminal, a mobile terminal control method, a mobile terminal control program, and a recording medium of the present invention, it is possible to switch a function of a mobile terminal depending on whether a sensor is contacted or not contacted.

BEST MODE FOR CARRYING OUT THE INVENTION

A mobile terminal, a mobile terminal control method, a mobile terminal control program, and a recording medium according to the present embodiment will be described in detail below with reference to the drawings. Note that the present embodiment is not limited to the following and that various changes may be made without departing from the spirit and scope of the present embodiment.

The present embodiment will be described using a mobile phone as a mobile terminal. A function of a mobile terminal to be switched depending on whether a sensor is contacted or not contacted will be described by taking, as an example, switching of a function related to a so-called lock mode.

FIG. 1 are external views showing an example of the configuration of a mobile phone according to the present embodiment.

As shown in FIG. 1, a mobile phone 1 according to the present embodiment includes an upper housing 2 and a lower housing 3 and is configured such that the upper housing 2 and lower housing 3 can be closed together through a hinge section 4. The sections will be described below one at a time.

First, the upper housing 2 will be described.

The upper housing 2 includes a display section 5 and a speaker 6.

The display section 5 displays various types of information in the mobile phone handset 1 and various types of information received from the outside through a built-in antenna (not shown). The speaker 6 converts a voice signal received from the outside or stored in the mobile phone 1 into voice and outputs the voice.

Then, the lower housing 3 will be described.

The lower housing 3 includes operation keys 7, a microphone 8, and a touch sensor 9.

The operation keys 7 are used to operate the mobile phone 1. A user handles and controls various types of information using the operation keys 7. A setting related to a method for locking the mobile phone 1 is also made by inputting from the operation keys 7. The microphone 8 acquires external voice as a voice signal. Such a voice signal is sent to the outside through the built-in antenna (not shown) during a call.

The touch sensor 9 senses, at the time of switching types of control over the mobile phone 1, whether it is contacted or not contacted from the outside. For example, a lock mode is turned on or off in the mobile phone 1 on the basis of whether the touch sensor 9 is contacted or not contacted.

Generally, a user operates a flip type mobile phone as in the present embodiment while holding the lower housing 3 with the user's hand. It is thus preferable that the touch sensor 9 is provided on the lower housing 3. Note that the touch sensor 9 may be provided at any position where a user's hand contacts the mobile phone 1 when the user operates it and that the touch sensor 9 is formed in a strip shape on the side opposite to the operation keys 7, i.e., on the back of the lower housing 3 in the present embodiment.

As described above, a lock mode is turned on and off in the mobile phone 1 of the present embodiment on the basis of contact detection by the touch sensor 9. While a user's hand is in contact with the touch sensor 9, the mobile phone 1 is not locked, and the user can normally operate and use the mobile phone 1. When the user's hand moves away from the touch sensor 9, a lock mode preselected by the user is turned on. Note that the mobile phone 1 is equipped with various lock modes for disabling various types of operations using the operation keys 7.

Examples of the various lock modes include an all lock for locking all functions, a PIM (Personal Information Manager) lock for locking an address book, scheduling function, and the like, and a mail folder lock for locking mail viewing. Various types of lock modes suited to user' demands are set. Among the various types of lock modes, a user sets in advance which lock mode is to be turned on.

When a hand moves away from the touch sensor 9 in this manner, the mobile phone 1 shifts to the preset lock mode. After that, when the user contacts the touch sensor 9 again, a turn-off process for turning off the lock mode, such as entry of a PIN number, is performed. The user becomes able to normally use and operate the mobile phone by performing unlock operation.

The software configuration of the present embodiment will be described now.

FIG. 2 is a block diagram showing the software configuration of the mobile phone 1 according to the present embodiment.

The mobile phone 1 of the present embodiment includes a control section 101, a communication section 102, a storage section 103, a display section 104, an operation section 105, a sensor 106, a determination section 107, a switching section 108, a timer 109, and an authentication section 110. These functional sections are structured to be connected through control lines such as a bus.

The control section 101 provides types of control over the entire mobile phone 1 and is composed of a CPU (Central Processing Unit) and the like. At the time of switching types of control over the mobile phone 1, such as the lock mode described above, the control section 101 controls the sensor 106, the determination section 107, the switching section 108, the timer 109, and the authentication section 110, all of which will be described later, and the like, thereby realizing mode switching processing.

The communication section 102 receives information from the outside and sends various types of information in the mobile phone 1 to the outside. The communication section 102 connects to a communication network.

The storage section 103 stores various types of data for the mobile phone 1 and is composed of a ROM (Read Only Memory) recording a control program for controlling the mobile phone 1 and pieces of information for an application and the like, a RAM (Random Access Memory) as a storage section which, upon activation of a predetermined application program, temporarily stores pieces of information such as an image signal and a voice signal used during an execution of the program and serves as a work area for reading and writing information, and the like.

The display section 104 displays various types of image data of the mobile phone 1, such as a phone book, an e-mail message, and an image downloaded through the communication section 102, and displays an image on the basis of image signals from the control section 101. Note that it is also possible to speed up the process of displaying image data by mounting a VRAM (Video Random Access Memory) in the display section 104.

The operation section 105 selects various types of functions and operates functions of the mobile phone 1. An operation signal is sent from the operation section 105 to the control section 101.

The sensor 106 senses contact from the outside (e.g., when a user contacts the mobile phone 1). For example, if a lock mode is to be turned on or off in the present embodiment, information that the sensor is contacted or not contacted is sent to the determination section 107.

The determination section 107 determines a state of being contacted or not being contacted from the outside sensed by the sensor 106. The control section 101 controls the switching section 108 to switch types of control over the mobile phone 1 in accordance with a result of determination in the determination section.

The switching section 108 switches control states of the mobile phone 1. The control section 101 instructs the switching section 108 to perform switching on the basis of sensing whether the sensor 106 is contacted or not contacted and a determination made by the determination section 107.

The timer 109 measures a contact time or a non-contact time for the sensor 106 if the determination section 107 determines whether the sensor 106 is contacted or not contacted. The switching section 108 switches types of control over the mobile phone 1 in accordance with a time measured by the timer 109.

The authentication section 110 performs user authentication operation. For example, if a setting is made to turn off a lock mode upon contact with the sensor 106, the authentication section 110 displays authentication information such as a password prompt on the display section 104. Note that, at this time, input is entered through the operation section 105 and the lock mode is turned off if the inputted information is correct.

The operation of the mobile phone 1 according to the present embodiment will be described with reference to the drawing.

FIG. 3 is a flow chart showing the operation of the mobile phone 1 of the present embodiment.

First, it is determined whether a user's hand has been away from the touch sensor 9 for a certain time (step S101). If the user's hand is in contact with the touch sensor 9 (step S101: No), the determination operation is continued until the user's hand has been away from the touch sensor 9 for the certain time. If the user's hand has been away from the touch sensor 9 for the certain time (step S101: Yes), the mobile phone 1 shifts to a lock mode state (step S102).

After the shift to the lock mode state, it is determined whether the touch sensor 9 is contacted or not (step S103). If there is no contact with the touch sensor 9 (step S103: No), the determination operation is continued until contact with the touch sensor 9. If there is contact with the touch sensor 9 (step S103: Yes), it is determined whether the contact has continued for a certain time (step S104).

If a contact time has not continued for the certain time (step S104: No), the mobile phone 1 remains in the lock mode state, and the determination operation is continued until it is determined again that the touch sensor 9 is contacted. On the other hand, if the contact with the touch sensor 9 has continued for the certain time (step S104: Yes), a lock mode turn-off process is started (step S105). An example of the lock mode turn-off process is authentication processing using a PIN number. Note that, as for activation of the lock mode turn-off process, activation processing is preferably performed in a short time of, e.g., about 1 second after the hand contacts the touch sensor 9.

It is checked whether the lock mode turn-off process is successful (step S106). If the turn-off process is successful (step S106: Yes), a lock mode is turned off, and normal control is provided over the mobile phone 1. On the other hand, if the lock mode turn-off process is unsuccessful, i.e., authentication is unsuccessful (step S106: No), the mobile phone 1 remains in the lock mode state, and the lock mode turn-off process is performed again.

Note that, after the lock mode is turned off in the above-described manner, the procedure shifts again to step S101 to detect whether the hand has been not in contact with the touch sensor 9 for the certain time.

Note that the certain time related to a shift to the lock mode (a non-contact time for the touch sensor 9) in the above-described process in step S101 is longer than the certain time (the contact time for the touch sensor 9) in step S104. This is because a hand may be temporarily away from the touch sensor 9 during use of the mobile phone 1. For example, it is preferable to turn on the lock mode if a hand has been not in contact for a long time of, e.g., about 30 seconds.

As described above, according to the mobile phone 1 of the present embodiment, when a user's hand moves away from the touch sensor 9, the mobile phone 1 is locked. After the user's hand contacts the touch sensor 9 again, the mobile phone 1 immediately shifts to a turn-off process mode. This facilitates locking and unlocking and improves the lock mode utilization rate of a user. As a result, the security level of the mobile phone 1 increases.

In the present embodiment, a fingerprint sensor or vein sensor may be used instead of the touch sensor 9. Use of a fingerprint sensor, vein sensor, or the like which can identify a user eliminates the need for the operation of entering a PIN number as described above and the like. It is thus possible to more easily turn on and off a lock mode and dramatically reduce the processing time of decryption processing.

The touch sensor 9 has been described as being provided on the back of the lower housing 3 in the present embodiment. However, arrangement of a touch sensor is, of course, not limited to this, and a touch sensor may be provided on a side of the lower housing 3, as shown in FIG. 4, or a plurality of touch sensors may be provided on the back, as shown in FIG. 5. A touch sensor may be provided at any position where a user's hand (regardless of whether the hand is the user's dominant hand) contacts the mobile phone 1 when the user holds the mobile phone 1.

It is also possible in the present embodiment to switch types of control over the mobile phone 1 stepwise in accordance with a time measured by the timer 109, on the basis of user settings. The stepwise control switching will be described in the context of, for example, the above-described lock mode and the above-described all lock, PIM lock, and mail folder lock. When the non-contact time for the touch sensor 9 reaches 10 seconds, the mail folder lock is set. When the non-contact time for the touch sensor 9 reaches 20 seconds, the PIM lock is set. When the non-contact time for the touch sensor 9 reaches 30 seconds, the all lock is set. In this manner, stepwise lock processing is performed.

By turning on lock modes stepwise in accordance with the non-contact time for the touch sensor 9, as described above, it is possible to further improve the security protection related to operability for a user.

In the present embodiment, a lock mode is turned on or off depending on the presence or absence of hand contact with a touch sensor. Alternatively, another function may be turned on (e.g., switching to a power saving mode may be performed) or turned off. In this case, the power saving mode is turned off while a hand is contact with a touch sensor and is turned on when the hand has been away from the touch sensor (for a predetermined time).

Application of the present embodiment to the function of turning on/off a power saving mode as described above makes it possible to lengthen the continuous operation time of the mobile phone 1 by a time corresponding to saved power. Alternatively, a plurality of functions such as a lock mode and a power saving mode may be combined.

In other words, a mobile terminal and a mobile terminal control method according to the present embodiment become more effective not only by using the process of turning on/off a lock mode but also by using, as appropriate, various types of functions effective when the mobile phone 1 is being used and various types of functions effective when the mobile phone 1 is not being used in combination. As described above, various changes may be made to the present embodiment.

BRIEF DESCRIPTION OF THE DRAWINGS

FIG. 1 are views schematically showing the configuration of a mobile phone 1 according to the present embodiment;

DESCRIPTION OF SYMBOLS

Figure 2:
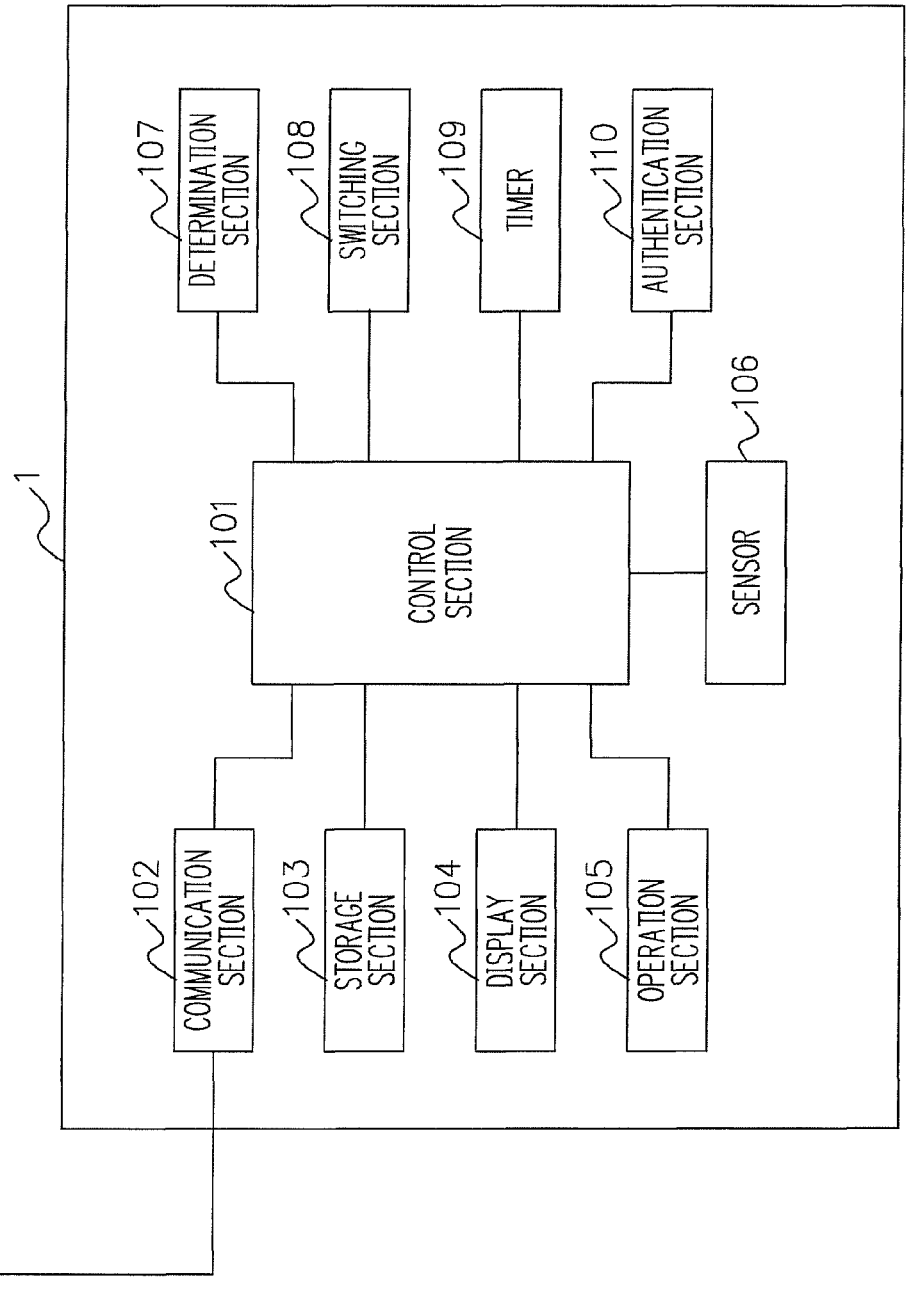
FIG. 2 is a diagram schematically showing the internal configuration of the mobile phone 1 of the present embodiment.
Figure 3:
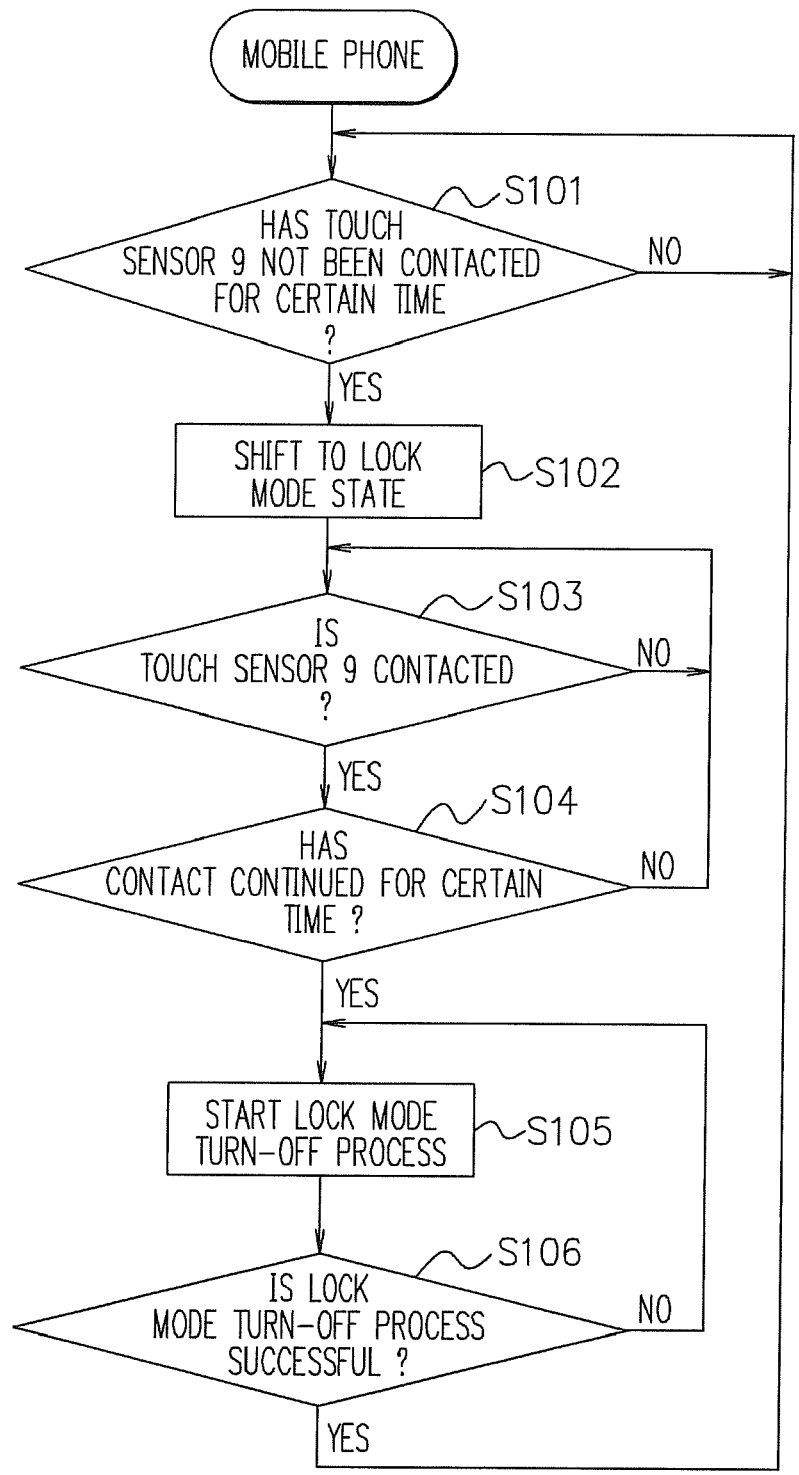
FIG. 3 is a flow chart showing the operation of the mobile phone of the present embodiment.
Figure 4:
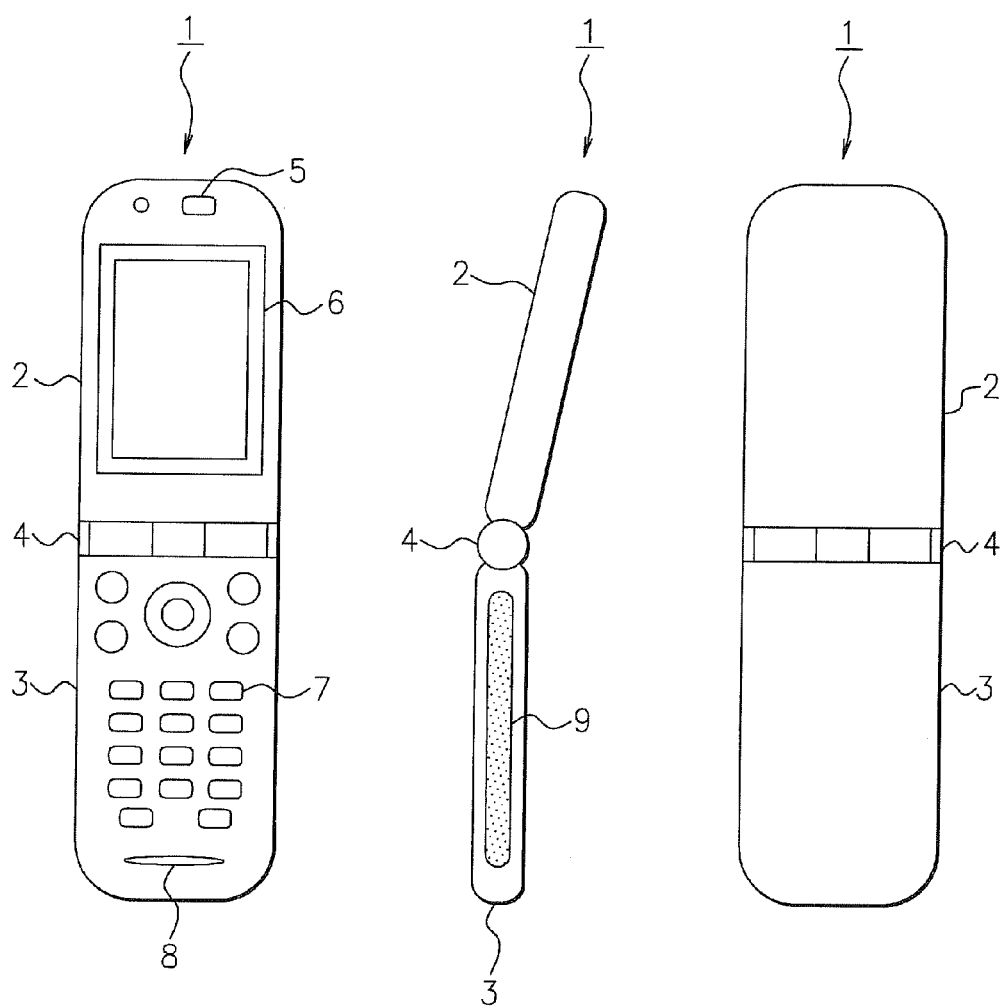
FIG. 4 are views showing another example of the configuration of the mobile phone 1 of the present embodiment.
Figure 5:
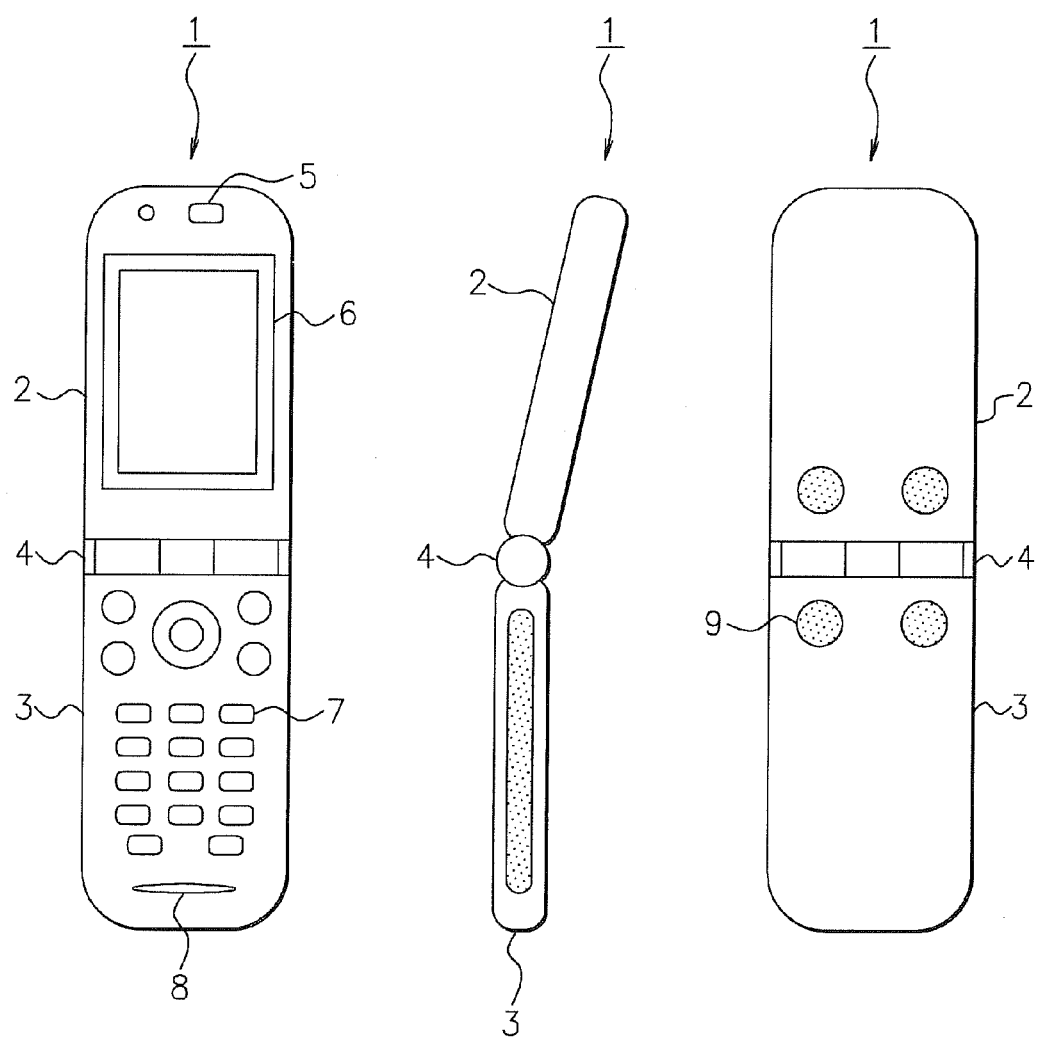
FIG. 5 are views showing another example of the configuration of the mobile phone 1 of the present embodiment.

1 mobile phone
2 upper housing
3 lower housing
4 hinge section
5, 104 display section
6 speaker
7 operation key
8 microphone
9, 106 touch sensor
101 control section
102 communication section
103 storage section
105 operation section

The invention claimed is:

1. A mobile terminal including a touch sensor, characterized by comprising:
    a control unit that controls the mobile terminal;
    a determination unit that determines presence or absence of contact with the touch sensor that is provided at any position where a user's hand contacts the mobile terminal when the user holds the mobile terminal; and
    a switching unit that switches control over the mobile terminal,
    wherein the control over the mobile terminal is switched by the switching unit on the basis of results of a determination obtained from the determination unit, characterized in that:
    when the touch sensor is not contacted,
        the mobile terminal shifts to a preset lock mode, wherein the switching unit switches the control to limit control for normal operation or to add other control to the control for normal operation, and wherein a certain time related to a shift to the lock mode is longer than a certain time which the contact with the touch sensor is continued, and
    when the touch sensor is contacted,
        the mobile terminal performs a turn-off process for turning off the lock mode to provide normal control over the mobile terminal, wherein the switching unit switches the control to provide the control for normal operation.

2. The mobile terminal according to claim 1, characterized in that the switching unit
    switches from the control when the sensor is not contacted to the control when the sensor is contacted if the determination unit determines that the sensor is contacted in the state when the sensor is not contacted and
    switches from the control when the sensor is contacted to the control when the sensor is not contacted if the determination unit determines that the sensor is not contacted in the state when the sensor is contacted.

3. The mobile terminal according to claim 1, characterized in that the mobile terminal includes a timer that measures a contact time and a non-contact time for the sensor and
    a switching time setting unit that sets a first set time for switching from the control when the sensor is contacted to the control when the sensor is not contacted and a second set time for switching from the control when the sensor is not contacted to the control when the sensor is contacted, and
    the switching unit
    switches the control when the contact time reaches the second set time or when the non-contact time reaches the first set time.

4. The mobile terminal according to claim 3, characterized in that the switching unit switches the control stepwise on the basis of the first set time and the second set time.

5. The mobile terminal according to claim 1, characterized by comprising an authentication unit that authenticates switching of the control over the mobile terminal, wherein the control is switched only when the authentication is successful.

6. The mobile terminal according to claim 5, characterized in that the mobile terminal
    comprises a personal information storage unit that stores personal information of an operator upon contact with the sensor; and
    a comparison unit that compares the personal information stored in the personal information storage unit with contact information currently in contact with the sensor, wherein
    the switching unit
    switches the control without the authentication if a result of comparison in the comparison unit shows that the personal information and the contact information agree with each other.

7. The mobile terminal according to claim 6, characterized in that the sensor is a fingerprint sensor or a vein sensor.

8. A control method for a mobile terminal including a touch sensor comprising:
    a determination step of determining whether the touch sensor that is provided at any position where a user's hand contacts the mobile terminal when the user holds the mobile terminal is contacted or not contacted wherein the control method is characterized by:
    a switching step of switching control over the mobile terminal in accordance with a determination obtained from the determination step, wherein:

if the determination is made that the touch sensor is not contacted, the mobile terminal shifts to a preset lock mode, wherein the switching step switches the control to limit control for normal operation or to add other control to the control for normal operation, and wherein a certain time related to a shift to the lock mode is longer than a certain time which the contact with the touch sensor is continued, and if the determination is made that the touch sensor is contacted, the mobile terminal performs a turn-off process for turning off the lock mode to provide normal control over the mobile terminal, wherein the switching step switches the control to provide the control for normal operation.

9. The mobile terminal control method according to claim 8, characterized in that the switching step switches from the control when the sensor is not contacted to the control when the sensor is contacted if it is determined that the sensor is contacted in the determination step in the state when the sensor is not contacted and switches from the control when the sensor is contacted to the control when the sensor is not contacted if it is determined that the sensor is not contacted in the determination step in the state when the sensor is contacted.

10. The mobile terminal control method according to claim 8, characterized in that the mobile terminal includes a timer that measures a contact time and a non-contact time for the sensor, the method comprises a switching time setting step of setting a first set time for switching from the control when the sensor is contacted to the control when the sensor is not contacted and a second set time for switching from the control when the sensor is not contacted to the control when the sensor is contacted, and the switching step switches the control when the contact time reaches the second set time or when the non-contact time reaches the first set time.

11. The mobile terminal control method according to claim 10, characterized in that the switching step switches the control stepwise on the basis of the first set time and the second set time.

12. The mobile terminal control method according to claim 8, characterized by comprising an authentication step of authenticating switching of the control over the mobile terminal, wherein the control is switched only when the authentication is successful.

13. The mobile terminal control method according to claim 12, characterized in that the mobile terminal comprises a personal information storage step of storing, in advance, personal information of an operator upon contact with the sensor; and a comparison step of comparing the personal information stored in the personal information storage step with contact information currently in contact with the sensor, wherein the switching step switches the control without the authentication if a result of comparison in the comparison step shows that the personal information and the contact information agree with each other.

14. A non-transitory computer-readable medium storing a mobile terminal control program for controlling a mobile terminal including a touch sensor, characterized by causing the mobile terminal to execute:

a control process of controlling the mobile terminal, wherein the control process comprises:

a determination process of determining whether the touch sensor that is provided at any position where a user's hand contacts the mobile terminal when the user holds the mobile terminal is contacted or not contacted; and a switching process of switching control over the mobile terminal in accordance with a determination obtained from the determination process, wherein:

if the determination is made that the touch sensor is not contacted, the mobile terminal shifts to a preset lock mode, wherein the switching step switches the control to limit control for normal operation or to add other control to the control for normal operation, and wherein a certain time related to a shift to the lock mode is longer than a certain time which the contact with the touch sensor is continued, and if the determination is made that the touch sensor is contacted, the mobile terminal performs a turn-off process for turning off the lock mode to provide normal control over the mobile terminal, wherein the switching step switches the control to provide the control for normal operation.

15. The computer-readable medium storing the mobile terminal control program according to claim 14, characterized in that the switching process switches from the control when the sensor is not contacted to the control when the sensor is contacted if the determination process determines that the sensor is contacted in the state when the sensor is not contacted and switches from the control when the sensor is contacted to the control when the sensor is not contacted if the determination process determines that the sensor is not contacted in the state when the sensor is contacted.

16. The computer-readable medium storing the mobile terminal control program according to claim 14, characterized in that the mobile terminal includes a timer that measures a contact time and a non-contact time for the sensor, the program causes the mobile terminal to execute a switching time setting process of setting a first set time for switching from the control when the sensor is contacted to the control when the sensor is not contacted and a second set time for switching from the control when the sensor is not contacted to the control when the sensor is contacted, and the switching process switches the control when the contact time reaches the second set time or when the non-contact time reaches the first set time.

17. The computer-readable medium storing the mobile terminal control program according to claim 16, characterized in that the switching process switches the control stepwise on the basis of the first set time and the second set time.

18. The computer-readable medium storing the mobile terminal control program according claim 14, characterized by causing the mobile terminal to execute an authentication process of authenticating switching of the control over the mobile terminal, wherein the switching process switches the control only when the authentication is successful.

19. The computer-readable medium storing the mobile terminal control program according to claim 18, characterized by causing the mobile terminal to execute:

a personal information storage process of storing, in advance, personal information of an operator upon contact with the sensor; and a comparison step of comparing the personal information stored in the personal information storage process with contact information currently in contact with the sensor, wherein the switching process switches the control without the authentication if a result of comparison in the comparison process shows that the personal information and the contact information agree with each other.

20. A mobile terminal including a touch sensor, characterized by comprising:

control means for controlling the mobile terminal;

determination means for determining presence or absence of contact with the touch sensor that is provided at any position where a user's hand contacts the mobile terminal when the user holds the mobile terminal; and switching means for switching control over the mobile terminal, wherein the control over the mobile terminal is switched by the switching means on the basis of results of a determination obtained from the determination means, characterized in that:

when the touch sensor is not contacted, the mobile terminal shifts to a preset lock mode, wherein the switching means switches the control to limit control for normal operation or to add other control to the control for normal operation, and wherein a certain time related to a shift to the lock mode is longer than a certain time which the contact with the touch sensor is continued, and when the touch sensor is contacted, the mobile terminal performs a turn-off process for turning off the lock mode to provide normal control over the mobile terminal, wherein the switching means switches the control to provide the control for normal operation.

* * * * *